(12) United States Patent     (10) Patent No.:   US 12,601,486 B2

Grech et al.     (45) Date of Patent:    Apr. 14, 2026

(54) HYDROGEN FUELLED GAS TURBINE ENGINE

(71) Applicant: ROLLS-ROYCE plc, London (GB)

(72) Inventors: Nicholas Grech, Derby (GB); Jacopo Tacconi, Derby (GB); Chloe J. Palmer, Derby (GB)

(73) Assignee: Rolls-Royce plc, London (GB)

( * ) Notice: Subject to any disclaimer, the term of this patent is extended or adjusted under 35 U.S.C. 154(b) by 87 days.

(21) Appl. No.: 18/746,568

(22) Filed: Jun. 18, 2024

(65)       Prior Publication Data

US 2025/0224112 A1     Jul. 10, 2025

(30)     Foreign Application Priority Data

Jul. 10, 2023    (GB) ..................................... 2310551

(51) Int. Cl.
    *F23R 3/28*       (2006.01)
    *F01D 15/10*      (2006.01)
    *F02C 3/22*       (2006.01)
    *F02C 7/224*      (2006.01)
    *F02C 9/40*       (2006.01)

(52) U.S. Cl.
    CPC ............... *F23R 3/28* (2013.01); *F01D 15/10* (2013.01); *F02C 3/22* (2013.01); *F02C 7/224* (2013.01); *F02C 9/40* (2013.01); *F05D 2220/323* (2013.01); *F05D 2220/76* (2013.01); *F05D 2300/121* (2013.01)

(58) Field of Classification Search
    CPC ............... F02C 3/22; F02C 7/224; F23R 3/28
    See application file for complete search history.

(56)        References Cited

U.S. PATENT DOCUMENTS

| | | | |
|---|---|---|---|
| 10,989,117 B2 | 4/2021 | Roberge | |
| 2021/0207537 A1* | 7/2021 | Roberge | F02C 3/22 |
| 2021/0215052 A1* | 7/2021 | Matsuyama | F01D 1/06 |
| 2022/0099020 A1* | 3/2022 | Palmer | F02C 9/26 |
| 2022/0178307 A1 | 6/2022 | Palmer et al. | |
| 2023/0145878 A1 | 5/2023 | Roberge | |
| 2023/0167788 A1 | 6/2023 | Soto Carril | |

FOREIGN PATENT DOCUMENTS

EP      4163481 A1    4/2023

OTHER PUBLICATIONS

European search report dated Nov. 6, 2024, issued in EP Patent Application No. 24180972.2.
Great Britain search report dated Oct. 9, 2023, issued in GB Patent Application No. 2310551.3.
Response to Extended Search Report dated Nov. 18, 2024, from counterpart European Application No. 24180972.2 filed Jan. 20, 2025, 41 pp.

* cited by examiner

*Primary Examiner* — Scott J Walthour

(74) *Attorney, Agent, or Firm* — Shumaker & Sieffert, P.A.

(57)        ABSTRACT

A gas turbine engine is configured to combust hydrogen fuel. The gas turbine engine comprises a fuel system comprising: a fuel pump configured to provide pressurised fuel to a core combustor of the gas turbine engine; a recuperator configured to heat fuel from combustion gases downstream of the core combustor; a fuel turbine downstream in fuel flow of the recuperator. The fuel turbine being configured to be driven by heated fuel and configured to power the fuel pump. Wherein the fuel turbine has an expansion ratio between 1.4 and 2.5.

18 Claims, 6 Drawing Sheets

HYDROGEN FUELLED GAS TURBINE ENGINE

CROSS-REFERENCE TO RELATED APPLICATIONS

This specification is based upon and claims the benefit of priority from UK patent application number 2310551.3 filed on Jul. 10, 2023, the entire contents of which are incorporated herein by reference.

BACKGROUND

Technical Field

This disclosure relates to hydrogen fueled gas turbine engines.

Description of the Related Art

Combined cycle engines have previously been proposed that comprise a gas turbine gas turbine cycle coupled with a fuel expansion cycle that recovers power from the fuel for the gas turbine. Such configurations typically make use of the properties of cryogenic fuels, in which a significant proportion of the exergy used in the liquefaction process may be recovered by an expansion process.

Designing such systems such that they can operate efficiently over the full operational range of an aircraft gas turbine engine presents significant challenges.

SUMMARY

In a first aspect, there is provided a gas turbine engine configured to combust hydrogen fuel, the gas turbine engine comprising a fuel system comprising:

a fuel pump configured to provide pressurised fuel to a core combustor of the gas turbine engine;

a recuperator configured to heat fuel from combustion gases downstream of the core combustor;

a fuel turbine downstream in fuel flow of the recuperator, the fuel turbine being configured to be driven by heated fuel and configured to power the fuel pump; wherein the fuel turbine has an expansion ratio between 1.4 and 2.5.

The fuel turbine may comprise an aluminium alloy rotor, and may have an expansion ratio of between 1.4 and 1.6.

The fuel turbine may be configured to mechanically drive the fuel pump, and/or may be configured to drive an electrical generator. Advantageously, excess energy from the fuel turbine can be utilised by the aircraft.

The fuel pump may be coupled to an electric motor. Advantageously, where the fuel turbine cannot provide sufficient power to fully operate the fuel pump, power can be introduced by the electric motor.

The fuel pump may be configured to be driven by a core gas turbine engine shaft, and the fuel turbine may be configured to drive to the core gas turbine engine shaft. As such, during parts of the engine cycle, fuel turbine power for driving the fuel pump can be supplemented by main engine shaft power. Similarly, where excess fuel turbine power is available, the core engine shaft can be driven by the fuel turbine.

The gas turbine engine may comprise a pre-heater configured to heat hydrogen fuel. The pre-heater may be provided in hydrogen fuel flow between the fuel pump and the recuperator. The inventors have found that there is a risk of frost accumulating on the recuperator on the core gas turbine engine flow side, in view of the low temperatures of the fuel in the recuperator. Consequently, by pre-heating the fuel upstream of the recuperator, frost is avoided. On the other hand, by providing the pre-heater downstream of the pump, pump work is reduced, thereby increasing overall engine efficiency. Fuel temperature can also be more readily controlled independently of fuel flow rate and engine exhaust temperature.

The fuel system may be configured to provide fuel to a fuel injector of the gas turbine engine at a fuel delivery pressure to compressor air delivery pressure ratio of at least 1.5:1, and may be configured to provide a provide fuel to a fuel injector of the gas turbine engine at a fuel delivery pressure to compressor air delivery pressure ratio of between least 1.5:1 and 2:1.

The compressor air delivery pressure ratio may be between 10:1 and 50:1, and may be between 20:1 and 45:1, and may be approximately 40:1.

The fuel system may comprise a fuel storage unit configured to store cooled hydrogen, and may be configured to store liquid hydrogen or cryogenically cooled compressed gaseous or supercritical hydrogen.

The fuel storage unit may be configured to store hydrogen as a liquid at a temperature of less than 30 Kelvin (K), and preferably less than 25K, and may be configured to store hydrogen at a pressure of between 1 and 4 Bar.

The fuel pump may be configured to provide a maximum pressure ratio of between 10:1 and 60:1, and may be configured to provide a pressure ratio of between 15:1 and 40:1, and may be configured to provide a pressure ratio of approximately 20:1.

The recuperator may be configured to increase the fuel temperature in use to between 270K and 600 K, and preferably may be configured to increase the fuel temperature to between 550K and 600K.

In a second aspect, there is provided a method of operating a hydrogen-fueled gas turbine engine, the method comprising:

operating a fuel pump to provide pressurised fuel to a core combustor of the gas turbine engine;

operating a recuperator to heat fuel from combustion gases downstream of the core combustor;

operating a fuel turbine downstream in fuel flow of the recuperator, the fuel turbine being driven by heated fuel and configured to power the fuel pump; wherein the fuel turbine is operated to provide expansion ratio between 1.4 and 2.5.

In a third aspect, there is provided an aircraft comprising the gas turbine engine of the first aspect.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
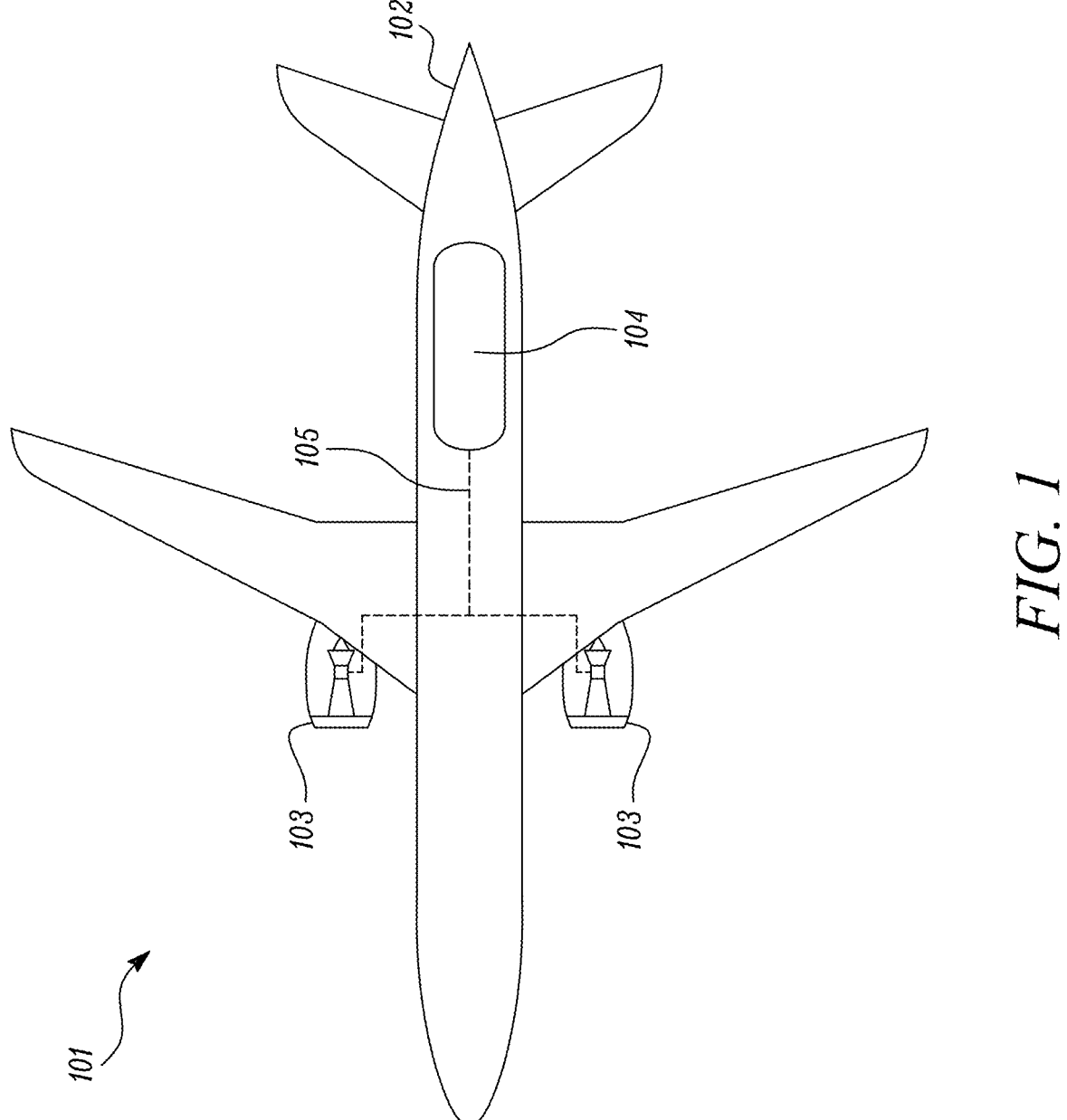
FIG. 1 shows an airliner comprising a hydrogen powered gas turbine engine.

A cryogenic hydrogen fueled airliner is illustrated in FIG. 1. In this example, the airliner 101 is of substantially conventional tube-and-wing twinjet configuration with a central fuselage 102 and substantially identical engines 103 which are mounted in an underwing configuration.

A cryogenic fuel storage system 104 is located in the fuselage 102 and is connected with the engines 103 via a fuel delivery system 105. In an embodiment, the cryogenic fuel is stored at or below its boiling point.

In the present embodiment, the cryogenic fuel is hydrogen stored as a liquid, below its boiling point. In a specific embodiment, the cryogenic fuel storage system 104 is configured to store the hydrogen fuel at 25 kelvin. In the present embodiment, the hydrogen fuel is pressurised to a pressure from 1 to 3 bar, and in a specific example, 2 bar. It will be appreciated that the principles of the present invention may be extended to hydrogen fuel stored at higher pressures and/or temperatures, and may be applicable to hydrogen stored as either a compressed gas or a supercritical fluid.

Figure 2:
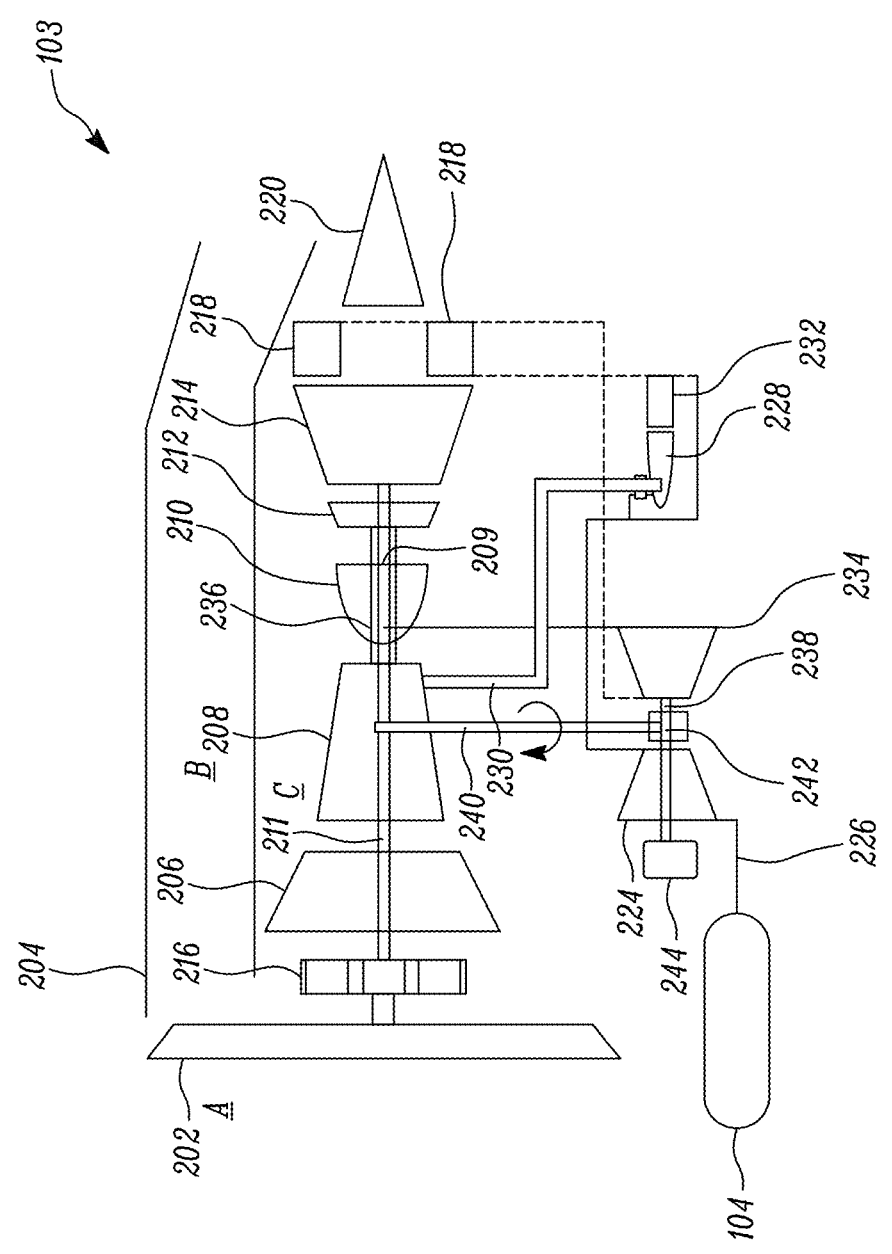
FIG. 2 shows a fuel system and gas turbine engine of FIG. 1.

In the present embodiment, the engines 103 are combined-cycle engines formed of a gas turbine cycle coupled with a fuel expansion cycle, in which the fuel for the gas turbine cycle is the working fluid of the fuel expansion cycle. A block diagram of this configuration is shown in FIG. 2, which only shows one of the engines 103 for clarity.

In the present embodiment, the engine 103 is a turbofan comprising a ducted fan 202 located in a nacelle 204. The fan 202 receives intake air A and generates two airflows: a bypass flow B which passes axially through a bypass duct 303 and a core flow C which enters the gas turbine cycle 202.

The gas turbine cycle 202 comprises, in axial flow series, a low-pressure compressor 206, a high-pressure compressor 208, a combustor 210, a high-pressure turbine 212, and a low-pressure turbine 214.

In operation, the core flow C is compressed by the low-pressure compressor 206 and is then directed into the high-pressure compressor 208 where further compression takes place. The compressed air exhausted from the high-pressure compressor 208 is directed into the combustor 210 where it is mixed with fuel and the mixture is combusted.

Following combustion, the resultant hot combustion products are discharged from the combustor 210 and expand through, and thereby drive, the high-pressure turbine 212 and in turn the low-pressure turbine 214.

The fan 202 is driven by the low-pressure turbine 214 via a reduction gearbox 216. In the present embodiment, the reduction gearbox 216 takes the form of an epicyclic gearbox. In alternative arrangement, the gearbox may be omitted and the engine 103 configured as a direct-drive engine, either in a two-spool or three-spool arrangement.

After passing through the low-pressure turbine 214, the combustion products from the gas turbine cycle 202 still retain a considerable amount of enthalpy.

The high-pressure turbine 212 is coupled to the high-pressure compressor 208 via a high-pressure shaft 209. The low-pressure turbine 214 is coupled to the low-pressure compressor 206 and gearbox 216 via a low-pressure shaft 211.

In the present embodiment, a heat exchanger system comprising a recuperator 218 is located in the gas path downstream of the low-pressure turbine 214 to facilitate transfer of waste heat from the combustion products into the fuel. Continuing in core gas turbine engine flow, cooled combustion products exiting the recuperator 218 are exhausted to atmosphere via a core nozzle 220.

Turning now to the hydrogen fuel flow, hydrogen fuel from the hydrogen storage system 104 is provided to a high-pressure fuel pump 224 via a hydrogen fuel conduit 226. Fuel upstream of the high-pressure pump 224 is generally in a liquid state, as shown by the solid line in FIG. 2. One or more separate low-pressure pumps (not shown) may also be provided upstream of the high-pressure pump 224. Though the hydrogen fuel pump 224 is shown as a single component in FIG. 2, it will be appreciated that the hydrogen fuel pump may comprise a plurality of stages, each configured to raise the pressure of the fuel for delivery to a subsequent stage.

In general, the fuel pump 224 comprises a multi-stage centrifugal pump configured to provide a fuel pressure ratio of between 10:1 and 200:1 at aircraft maximum take-off power conditions. In other words, the ratio between fuel pressure and atmospheric pressure during take-off is between 10:1 and 200:1. As will be appreciated, maximum take-off thrust for a given engine can be defined as the maximum thrust for which an engine is certified. Typically, this will be achieved at a speed above static, such as approximately Mach 0.25. Maximum thrust may be flat-rated, or may vary according to temperature, with the highest thrust available at any temperature for which the engine is certified defining the maximum take-off thrust. In one embodiment modelled by the inventors, the fuel pump is configured to provide a pressure ratio of approximately 100:1, and provides an absolute pressure of approximately 80 to 120 Bar, and provides fuel at an outlet at a temperature of approximately 30 K. At these conditions, the hydrogen is in a supercritical state.

Such a high pressure ratio is required to provide the fuel at the conditions necessary for downstream components, as will be described in more detail below.

Downstream in hydrogen fuel flow of the pump 224 is a fuel preheater 228. The fuel pre-heater 228 is configured to raise the temperature of the hydrogen fuel, which is typically still in a liquid phase, downstream of the pump 224. The pre-heater serves 228 three main roles-firstly, to enable starting of the engine when insufficient heat is generated by the recuperator 218, secondly to avoid overcooling the recuperator 218, which may result in icing, and thirdly to provide improved control of fuel temperature independent of fuel flow rates and engine exhaust gas temperatures.

In various embodiments, the pre-heater 228 may comprise any suitable heat source, such as an electrical heater. In this embodiment, the pre-heater comprises an auxiliary combustor which is configured to draw on a portion of fuel tapped off from the hydrogen fuel conduit 226, and combust this fuel with compressed air drawn from the high-pressure compressor 208 via a bleed air line 230. Combustion gases from the auxiliary combustor are used to heat hydrogen in the conduit 226 via a heat exchanger 232. Consequently, fuel downstream of the heat exchanger 232 is typically vaporised, and is now in either a gaseous or supercritical phase, as shown by the dashed lines. It will be appreciated however that in some embodiments, the pre-heater may be omitted.

Hydrogen downstream of the pre-heater is typically at substantially the same pressure as hydrogen upstream, with only slight pressure losses being encountered. Temperature is raised somewhat, with typical temperatures being between 70 and 80 K at maximum take-off conditions.

The recuperator 218 is provided downstream of both the pump 224 and the pre-heater 228 (where present) in hydrogen fuel flow.

Pressurised, heated hydrogen flows through a first side of the recuperator 218, further heating the hydrogen fuel, which cools gas turbine engine core exhaust gases which flow through a second side, separated from the first side. Typically, hydrogen fuel is heated by the recuperator 218 to somewhat above a minimum fuel injection temperature, which may be greater than 273 K for example, to avoid icing. In embodiments modelled by the inventors, hydrogen is heated to between 500 and 600 K by the recuperator. Higher heating is possible, but requires an excessively large recuperator, which may result in core exhaust restriction and reduced gas turbine engine performance. On the other hand, lower heating in the recuperator affects fuel turbine performance, as will be discussed below. In one embodiment modelled by the inventors, hydrogen is heated to 585 K. A pressure drop also occurs in the hydrogen recuperator, such that pressure downstream of the recuperator is slightly below that delivered to the recuperator. However, this is typically minimal. Flow of heated hydrogen downstream of the heat exchanger 218 is shown by the dotted lines in FIG. 2.

Downstream of the recuperator 218 in hydrogen fuel flow is a fuel turbine 234. The fuel turbine 234 is configured to extract mechanical power from the heated, gaseous hydrogen in the fuel conduit 217 downstream of the recuperator 218.

The fuel turbine 234 comprises an axial or centrifugal turbine, which may for instance comprise a lightweight, strong material such as aluminium. Aluminium is chosen because of its high tensile strength, and the relatively low temperatures as the inlet conditions. Additionally, aluminium is resistant to hydrogen embrittlement. Suitable alternative materials include stainless steel.

The hydrogen fuel turbine 234 consists of a single stage having an expansion ratio of between 1.4:1 and 2.5:1. That is to say, a ratio between the total pressure at an inlet of the fuel turbine 234 to the total pressure at an outlet of the fuel turbine 234 is between 1.4 and 2.5. This expansion ratio is relatively unchanged during normal operation between maximum and minimum conditions, and is typically defined by the geometry of the turbine rather than its operation. However, where the expansion ratio varies in use, the expansion ratio is defined herein may comprise the maximum expansion ratio for which the turbine is designed and certified for use in the engine. In a specific example modelled by the inventors, where the fuel turbine comprises an aluminium impellor, the fuel turbine 234 has an expansion ratio of between 1.4 and 1.6. It has been found that expansion ratios greater than 1.6 in a single stage are impractical using this material in view of tip speed limits. In one example modelled by the inventors, the fuel turbine expansion ratio is approximately 1.5. As such, the pressure downstream of the fuel turbine 234 is approximately 66 bar at maximum take-off conditions, and the temperature is approximately 550 K. In another example modelled by the inventors, the expansion ratio is 2.0.

One or more injectors 236 are provided downstream in hydrogen fuel flow of the fuel turbine 234. The injectors provide hydrogen to the combustor 236 at an injection temperature and pressure. Typically, in order to provide sufficient flow into the combustor 236, the injectors are configured to be operated at an injection pressure ratio of approximately 2:1, and in this example, 2.1:1. As such, the recuperator 218 defines the inlet conditions for the fuel turbine 234, while the injector 236 defines the outlet conditions.

The fuel turbine 234 and fuel pump 224 are coupled by a drive arrangement comprising a shaft 238. The shaft 238 couples the turbine 234 and pump 224 such that they rotate together. An engine electrical generator 244 is also optionally coupled to the shaft 238. As such, the fuel turbine 234 at least partly drives the fuel pump 224, and optionally also drives the engine electrical generator 244. Further loads may also be driven by the fuel turbine 234.

The fuel turbine 234 and fuel pump 224 are also both coupled to the high-pressure shaft 209 via a tower shaft 240. A combining gearbox 242 is provided, which combines the inputs and outputs of the tower shaft 240, turbine 234 and pump 224. As such, at least power output from the high-pressure turbine shaft 209 is provided to the fuel pump 224, to supplement motive power from the fuel turbine 234. This may be necessary at various phases of engine operation. Consequently, the system ensures stable operation during all phases of flight. In some cases, excess power from the turbine 234 can be provided to the high-pressure shaft 240, which can thereby increase gas turbine engine core efficiency.

In operation, the engine operates in accordance as follows.

Hydrogen is delivered from the fuel tank 104 to the fuel pump 224, where fuel pressure is increased. Where the hydrogen is provided from the tank as a liquid, the pump typically maintains the hydrogen in liquid phase. This fuel is delivered to the pre-heater. When the preheater is operational, a portion of the fuel is diverted to the combustor, where it is combusted with air, while the remainder is heated by heat exchange with preheater exhaust gases in the pre-heater. Where the preheater is non-operational, hydrogen passes through the preheater without being significantly heated. Hydrogen fuel is then delivered to the recuperator 218, where it is further heated. The heated fuel is then delivered to the fuel turbine 234 where it is expanded, and provided to the injectors 206.

In driving the turbine 234, torque is generated, which is provided to the pump 224 via the shaft 238 and/or gearbox 242. Additional torque can be provided to the pump 234 from the engine high-pressure shaft 209 and tower shaft 240 via the gearbox 242 where required. Alternatively, excess turbine power that cannot be absorbed by the pump 242 can be delivered to the engine core via the gearbox 242 and tower shaft 238.

Figure 5:
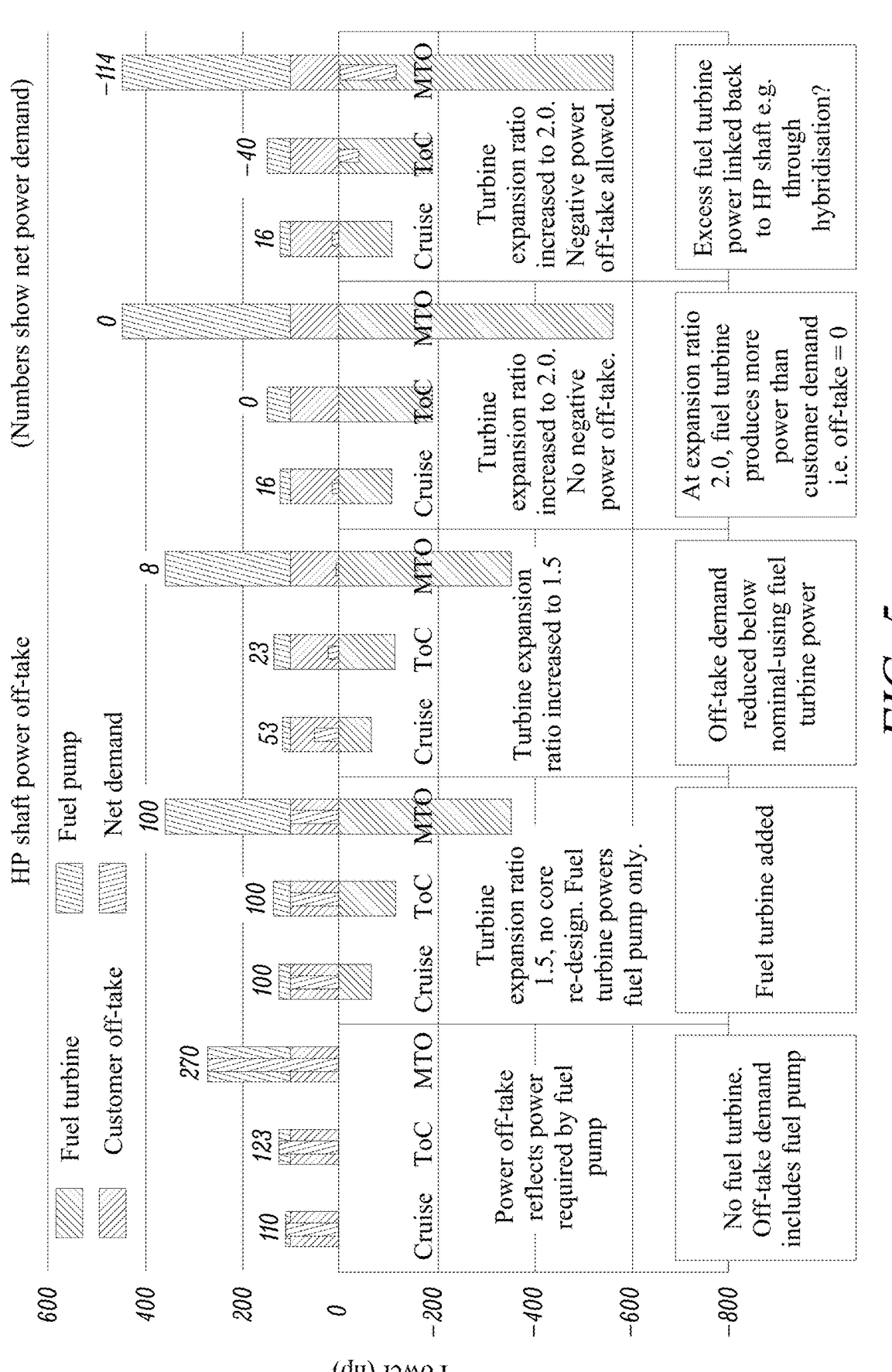
FIG. 5 shows the power required by various parts of the aircraft and gas turbine engine versus power generated by the fuel turbine for various engine conditions and system configurations.

FIG. 5 illustrates the impact the provision of the fuel turbine has on the operational cycle of a modelled engine. The engine modelled is a mid-sized engine, having a nominal thrust of approximately 25,000 pounds force (lbf). In a first example, shown in the first three bars in FIG. 5, a baseline cycle is shown, in which the fuel turbine is not present, but the recuperator and pre-heater are provided. In this example, all pump power is provided by a shaft offtake. As can be seen, high-pressure shaft power offtake varies from 110 Horsepower (hp) at cruise, to 123 hp at Top of Climb (ToC), to 270 hp at Maximum Take-off Thrust (MTO). Much of this demand originates from so called "customer off-take" demand, which largely comprises engine electrical generator load. The fuel pump demand varies considerably during flight, both as a result of varied fuel flow demand and varied fuel pressure delivery requirements, with both being highest at maximum take-off.

In the fourth to sixth bars in FIG. 5, the fuel turbine 234 is added to the cycle. In this embodiment, a fuel turbine expansion ratio of 1.5 is selected. As can be seen, the fuel turbine 234 provides sufficient power to drive the fuel pump 224 at all engine conditions. In this embodiment, the high-pressure offtake shaft is still required to drive customer loads. Net power demand is however substantially reduced, resulting in a substantially constant high-pressure turbine offtake demand of 100 hp, down from a maximum of 270 hp. This reduced demand directly increases engine efficiency, and may also have additional benefits. For example, the reduced variability in power offtake may allow for improved compressor performance. It may also permit lower shaft and gearbox weights.

In the seventh to ninth bars in FIG. 5, the turbine expansion ratio is maintained at 1.5. In this embodiment, the excess turbine power is used to drive customer loads, such as the engine generator 244. As can be seen, net high-pressure shaft offtake demand falls to a maximum of 53 hp, and this now occurs at cruise, rather than at maximum take-off power. As will be appreciated, at maximum take-off power, high-pressure shaft loads are highest, and so reducing power offtake demands at this stage of the flight cycle is particularly beneficial.

In the tenth to twelfth bars of FIG. 5, the fuel turbine expansion ratio is increased to 2.0. as can be seen, this further reduces power offtake demand, to a maximum of 16 hp, and to 0 at maximum take-off thrust at sea level. As such, further increases in turbine expansion ratio will typically not provide significant benefit, as almost all turbine power is absorbed.

In the final bars of FIG. 5, the model allows for "negative power offtake", in which torque is fed back to the high-pressure shaft when excess turbine power is available. In this case, compressor pressure ratio and/or mass flow can be increased, thereby improving gas turbine engine performance. Up to 100 hp can be fed back to the engine in this manner, which is significant.

Figure 6:
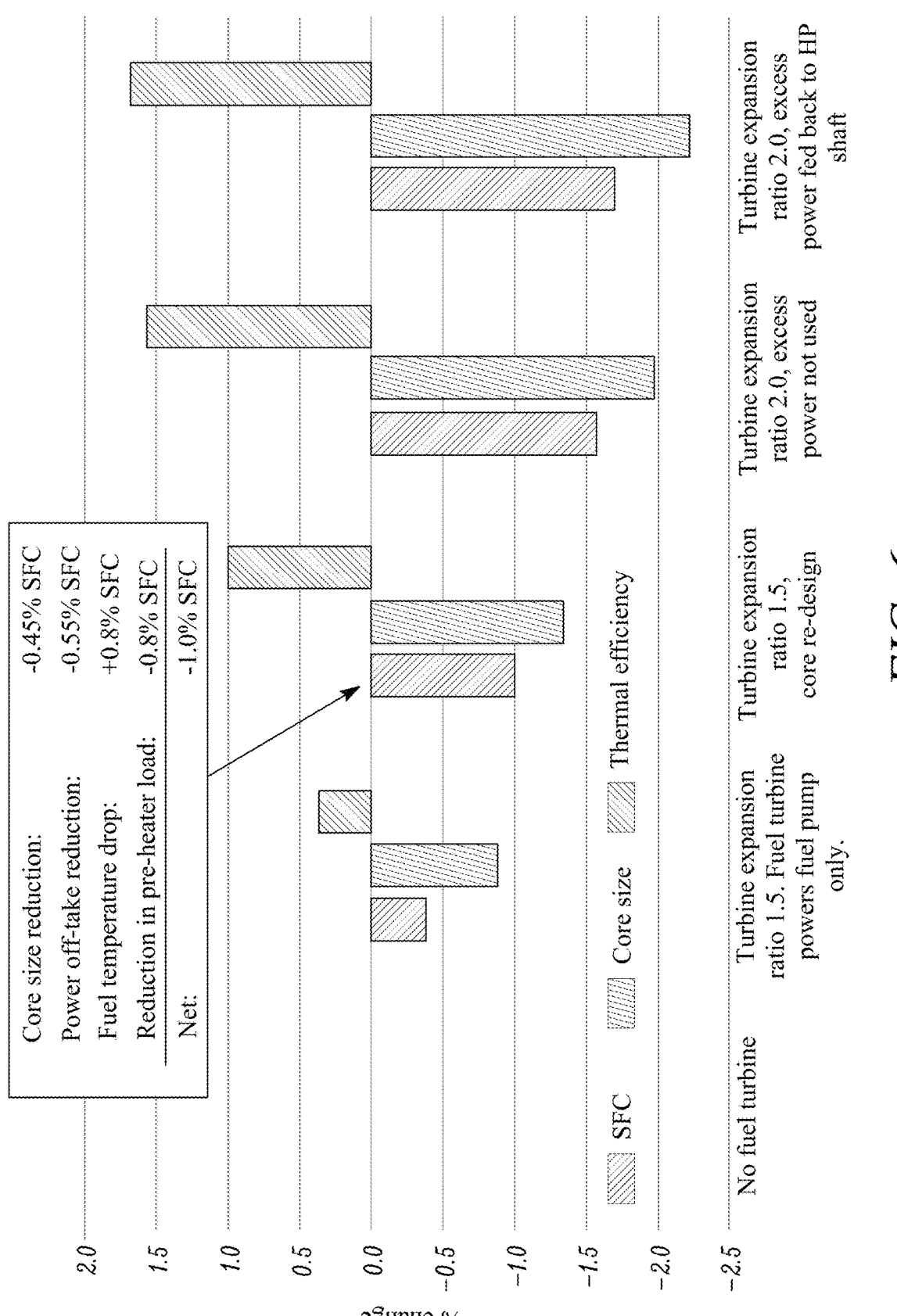
FIG. 6 shows the effect of various configurations on overall engine efficiency and core size.

The overall impact on Thrust Specific Fuel Consumption (SFC), engine core size, and thermal efficiency of each of these embodiments compared to the baseline is shown in FIG. 6. As can be seen, benefits in each of SFC, core size and thermal efficiency are provided in even the first embodiment (in general, lower SFC and core size is desirable, while higher thermal efficiency is desirable). Improvements in specific fuel consumption are particularly desirable, as this increases range and reduces operating costs. Reduced core size typically results in lower engine weight, which also improves range and reduces aircraft operating costs.

As can be seen, improvement of up to 1.7% SFC can be realized using the invention, while core size reductions of up to 2.2% can also be achieved. Such benefits are significant, particular for hydrogen fueled aircraft, where adequate range can prove to be a challenge.

Figure 3:
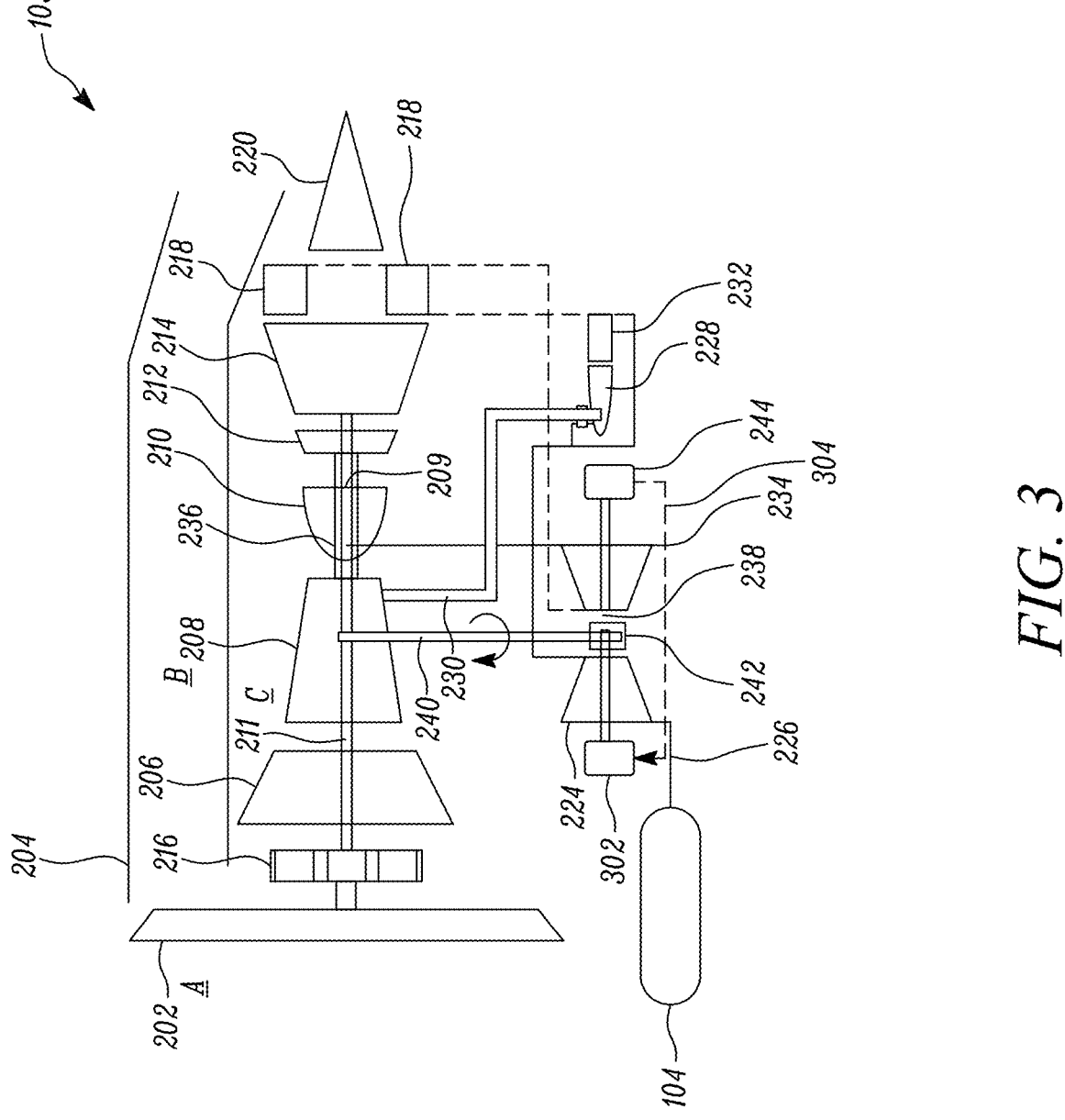
FIG. 3 shows a first alternative fuel system and gas turbine engine.

FIG. 3 illustrates an alternative embodiment. In this embodiment, the fuel turbine 234 and fuel pump 224 are not directly mechanically coupled. The fuel turbine 234 is coupled to a generator 244, which is configured to provide electrical power to a motor 302 via an electrical interconnector 304 which in turns drives the pump 224. The pump 224 is coupled to the tower shaft 240 and gearbox 242, such that the motor 302 can both drive the pump 224 and provide power to the gas turbine engine core. In the event of a failure, mechanical power can be provided to the pump 224 via the tower shaft 240.

As such, rotational speed of the turbine 234 is decoupled from the rotational speed of either the pump 224 or the gas turbine engine core. Additionally, the system may be more resistant to failure, since a failure of the fuel turbine 234 does not prevent rotation of the fuel pump 302.

Figure 4:
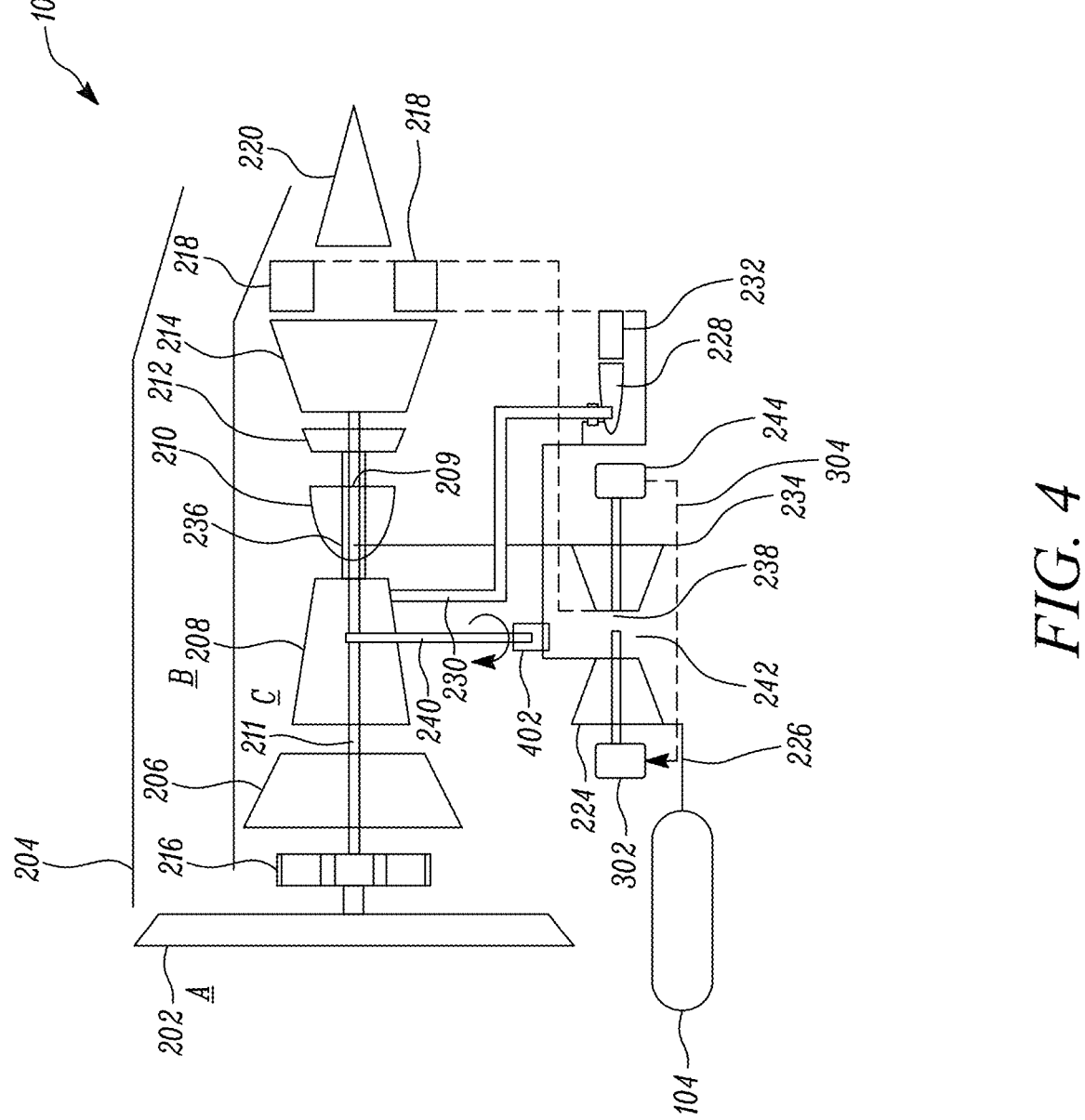
FIG. 4 shows a second alternative fuel system and gas turbine engine.

FIG. 4 shows a further alternative embodiment. In this embodiment, the tower shaft 240 is entirely mechanically decoupled from either the fuel pump 302 or the fuel turbine 234. Instead, a tower shaft electric machine 402 is provided, which can operate as a generator and, optionally, as a motor. When operating as a generator, electrical power from the tower shaft can be used to provide customer electrical power, and to provide power to the fuel pump 224. A turbine generator 244 is also provided, which is coupled to the fuel turbine 234 as in the embodiment shown in FIG. 3. As such, electrical power to power the fuel pump 224 can be provided from one or both of the tower shaft electrical machine operating as a generator, and the fuel turbine generator 244.

In a further optional operating mode, excess electrical power provided by the fuel turbine 244 can be provided to the tower shaft electric machine 402, which operates as a motor to provide additional power to the high-pressure main engine core shaft 209. As such, gas turbine engine efficiency is improved, while each of the high-pressure shaft 209, fuel pump 224 and fuel turbine 244 can rotate independently, at a speed optimised for each component.

Alternative embodiments can be envisaged. For example, the fuel pump and fuel turbine could be coupled (mechanically or electrically) to the low-pressure shaft 211. The pre-heater could be provided upstream of the fuel pump, or downstream of the recuperator, or be omitted entirely. Different materials could be used for the fuel turbine, or it could comprise multiple stages.

The invention claimed is:

1. A method of operating a hydrogen-fueled gas turbine engine, the method comprising:
    operating a fuel pump to provide pressurised fuel to a core combustor of the gas turbine engine;
    operating a recuperator to heat fuel using combustion gases downstream of the core combustor;
    operating a single stage fuel turbine downstream in fuel flow of the recuperator, the single stage fuel turbine being configured to be driven by heated fuel and configured to power the fuel pump, wherein the single stage fuel turbine comprises an aluminium alloy rotor and has an expansion ratio between 1.4 and 1.6; and
    operating a pre-heater configured to heat hydrogen fuel, wherein:
        the pre-heater is provided in hydrogen fuel flow between the fuel pump and the recuperator.

2. A gas turbine engine configured to combust hydrogen fuel, the gas turbine engine comprising a fuel system comprising:
    a fuel pump configured to provide pressurised fuel to a core combustor of the gas turbine engine;
    a recuperator configured to heat fuel using combustion gases downstream of the core combustor;
    a single stage fuel turbine downstream in fuel flow of the recuperator, the single stage fuel turbine being configured to be driven by heated fuel and configured to power the fuel pump; and
    a pre-heater configured to heat hydrogen fuel, wherein:
        the pre-heater is provided in hydrogen fuel flow between the fuel pump and the recuperator; and
        the single stage fuel turbine comprises an aluminium alloy rotor and has an expansion ratio between 1.4 and 1.6.

3. The gas turbine engine according to claim 2, wherein the single stage fuel turbine is configured to mechanically drive the fuel pump.

4. The gas turbine engine according to claim 2, wherein the single stage fuel turbine is configured to drive an electrical generator.

5. The gas turbine engine according to claim 2, wherein the fuel pump is coupled to an electric motor.

6. The gas turbine engine according to claim 2, wherein the fuel pump is configured to be driven by a core gas turbine engine shaft.

7. The gas turbine engine according to claim 2, wherein the single stage fuel turbine is configured to drive a core gas turbine engine shaft.

8. The gas turbine engine according to claim 2, wherein the fuel system is configured to provide fuel to a fuel injector of the gas turbine engine at a fuel delivery pressure to compressor air delivery pressure ratio of at least 1.5:1.

9. The gas turbine engine according to claim 2, wherein a compressor air delivery pressure ratio at maximum take-off conditions is between 10:1 and 50:1, between 20:1 and 45:1, or approximately 40:1.

10. The gas turbine engine according to claim 2, wherein the fuel system comprises a fuel storage unit configured to store cooled hydrogen, and may be configured to store liquid hydrogen or cryogenically cooled compressed gaseous or supercritical hydrogen.

11. The gas turbine engine according to claim 10, wherein the fuel storage unit is configured to store hydrogen as a liquid at a temperature of less than 30K or at a temperature of less than 25K.

12. The gas turbine engine according to claim 10, wherein the fuel storage unit is configured to store hydrogen at a pressure of between 1 and 4 Bar.

13. The gas turbine engine according to claim 2, wherein the fuel pump is configured to;

provide a pressure ratio at maximum take-off conditions of between 10:1 and 60:1, provide a pressure ratio at maximum take-off conditions of between 15:1 and 40:1, or provide a pressure ratio at maximum take-off conditions of approximately 20:1.

14. The gas turbine engine according to claim 2, wherein the recuperator is configured to increase the fuel temperature to between 270K and 600 K or to between 550K and 600K.

15. An aircraft comprising the gas turbine engine of claim 2.

16. The gas turbine engine according to claim 2, wherein the pre-heater comprises an electrical heater.

17. The gas turbine engine according to claim 16, wherein the pre-heater comprises an auxiliary combustor.

18. The gas turbine engine according to claim 2, wherein the pre-heater is configured to:

enable starting the gas turbine engine when insufficient heat is generated by the recuperator, avoid overcooling of the recuperator, or control fuel temperature independent of fuel flow rates or engine exhaust gas temperatures.

\* \* \* \* \*